3,159,645
O-THIAZOLYL O-ALKYL PHOSPHORAMIDO-THIOATES

Raymond H. Rigterink, Midland, Mich., assignor to The Dow Chemical Company, Midland, Mich., a corporation of Delaware
No Drawing. Filed Dec. 29, 1960, Ser. No. 79,140
8 Claims. (Cl. 260—302)

The present invention is directed to the O-thiazolyl O-lower alkyl phosphoramidothioates corresponding to the following formula

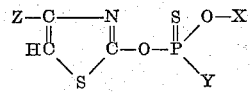

in this and succeeding formulae, X represents lower alkyl, Y represents amino or lower alkyl amino and Z represents lower alkyl, phenyl, lower alkoxyphenyl, lower alkylphenyl or halophenyl. In the present specification and claims, the expressions lower alkyl and lower alkoxy are employed to refer to the radicals containing from 1–5 carbon atoms, inclusive. These compounds are liquid materials which are somewhat soluble in many common organic solvents and of very low solubility in water. The compounds are useful as parasiticides and are adapted to be employed as active toxicants in compositions for the control of mite, insect, helminth, ascarid, bacterial and fungal organisms such as ticks, aphids, beetles and worms. The compounds are also useful as herbicides for the control of a number of undesirable grass and weed species such as pigweeds.

The novel compounds of the present invention may be prepared by reacting an O-lower alkyl phosphoramidochloridothioate corresponding with the formula

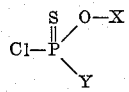

with an alkali metal salt of a 4-substituted-2-thiazolol corresponding with the formula

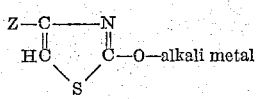

The reaction conveniently is carried out in an inert organic liquid as reaction medium such as benzene, toluene, isobutyl methyl ketone, methylene dichloride, chloroform or carbon tetrachloride. The amounts of the reagents to be employed are not critical, some of the desired products being obtained when employing any proportion of the reactants. In the preferred method of operation, good results are obtained when employing substantially equimolecular proportions of the alkali metal 4-substituted-2-thiazololate and phosphoramidochloridothioate. The reaction takes place smoothly at the temperature range of from 20° to 100° C. with the production of the desired product and alkali metal chloride byproduct. In carrying out the reaction, the reactants are mixed and contacted together in any convenient fashion and the resulting mixture thereafter maintained for a period of time in the reaction temperature range to complete the reaction. Upon completion of the reaction, the reaction mixture may be washed with water and any reaction medium removed by fractional distillation under reduced pressure to obtain the desired product as a residue. This product may be further purified by conventional procedures such as washing and extraction.

The following examples merely illustrate the invention and are not to be construed as limiting.

Example 1.—O-(4-Methyl-2-Thiazolyl) O-Ethyl N-Ethyl Phosphoramidothioate 4-methyl-2-thiazolol (11.5 grams; 0.1 mole), aqueous 50 percent sodium hydroxide (equivalent to 4.0 grams or 0.1 mole of NaOH), 10 milliliters of water and 250 milliliters of benzene were mixed together and heated with stirring at the boiling temperature to produce the sodium salt of 4-methyl-2-thiazolol. The heating was carried out with distillation of some of the benzene reaction medium together with the water of reaction as formed. This solvent mixture of the sodium 4-methyl-2-thiazololate was diluted with 50 milliliters of dimethyl formamide and 18.8 grams (0.1 mole) of O-ethyl N-ethyl phosphoramidochloridothioate added rapidly thereto with stirring. During the addition, the temperature of the reaction mixture rose from 26° to 36° C. Stirring was thereafter continued and the temperature raised to 60° C., and maintained at from 60° to 65° C. for two hours to complete the reaction. The reaction mixture was thereafter successively washed with dilute aqueous sodium hydroxide and water and the washed mixture fractionally distilled under reduced pressure to separate the organic reaction medium. As a result of these operations there was obtained an O-(4-methyl-2-thiazolyl) O-ethyl N-ethyl-phosphoramidothioate product as a liquid residue having a refractive index $n$/D of 1.5192 at 25° C.

Example 2.—O-[4-(p-Methoxyphenyl)-2-Thiazolyl] O-Methyl N-Isopropyl Phosphoramidothioate 4-(p-methoxyphenyl)-2-thiazolol (15 grams; 0.073 mole), aqueous 50 percent sodium hydroxide (equivalent to 2.9 grams or 0.073 mole of NaOH), 10 milliliters of water and 250 milliliters of benzene were mixed together and heated at the boiling temperature to produce a solvent mixture containing the sodium salt of 4-(p-methoxyphenyl)-2-thiazolol. The heating was carried out with distillation of some of the solvent reaction medium together with the water of reaction as formed. This mixture containing the sodium 4-(p-methoxyphenyl)-2-thiazololate was diluted with 50 milliliters of dimethyl formamide and 13.7 grams (0.073 mole) of O-methyl N-isopropyl phosphoramidochloridothioate added rapidly thereto with stirring. During the addition, the temperature of the reaction mixture rose from 24° to 29° C. The reaction mixture was then heated to from 60° to 65° C., and maintained thereat for two hours to complete the reaction. The reaction mixture was then diluted with 200 milliliters of water, cooled to 15° C., and filtered. The filtrate was thereafter successively washed with aqueous 2 percent sodium hydroxide and water, and the reaction medium removed from the washed mixture by fractional distillation under reduced pressure. The residue was thereafter diluted with 25 milliliters of carbon tetrachloride, the diluted mixture filtered and the carbon tetrachloride separated from the filtrate by fractional distillation under reduced pressure. As a result of these operations there was obtained an O-[4-(p-methoxyphenyl)-2-thiazolyl] O-methyl N-isopropyl phosphoramidothioate product as a liquid residue having a refractive index $n$/D of 1.5658 at 25° C.

Example 3.—O-[4-(p-Bromophenyl)-2-Thiazolyl] O-Methyl N-Isopropyl Phosphoramidothioate 4-(p-bromophenyl)-2-thiazolol (34 grams; 0.133 mole) aqueous 50 percent sodium hydroxide (equivalent to 5.5 grams or 0.138 mole of NaOH), 10 milliliters of water, 75 milliliters of dimethyl formamide and 250 milliliters of benzene were mixed together and heated at the boiling temperature with stirring to prepare the sodium salt of 4-(p-bromophenyl)-2-thiazolol. The heating was carried out with the distillation of some of the organic reaction medium together with the water of reaction as formed. This mixture containing the sodium 4-(p-bromophenyl)-2-thiazololate was mixed with 25.9 grams (0.138 mole) of O-methyl N-isopropyl phosphoramidochloridothioate with stirring. During the mixing the temperature of the reaction mixture rose to 29° C. Stirring was thereafter continued and the reaction mixture maintained at a temperature of from 60° to 65° C. for two hours to complete the reaction. The reaction mixture was thereafter diluted with 200 milliliters of water and the diluted mixture cooled to 10° C. and filtered. The filtrate was successively washed with aqueous 2 percent sodium hydroxide and water and the reaction medium removed from the washed filtrate by fractional distillation under reduced pressure. As a result of these operations there was obtained an O-[4-(p-bromophenyl)-2-thiazolyl] O-methyl N-isopropyl phosphoramidothioate product as a liquid residue having a refractive index $n/D$ of 1.5796 at 25° C.

*Example 4.—O-(4-Phenyl-2-Thiazolyl) O-Methyl N-Isopropyl Phosphoramidothioate*

4-phenyl-2-thiazolol (14.1 grams; 0.08 mole) aqueous 50 percent sodium hydroxide (equivalent to 3.2 grams or 0.08 mole of NaOH), 10 milliliters of water and 250 milliliters of benzene were mixed together and heated with stirring at the boiling temperature. The heating was carried out with distillation of some of the reaction medium together with the water of reaction as formed. This mixture containing the sodium 4-phenyl-2-thiazololate was diluted with 50 milliliters of dimethyl formamide and the diluted mixture mixed rapidly with 15 grams (0.08 mole) of O-methyl N-isopropyl phosphoramidochloridothioate. During the mixing with the phosphoramidochloridothioate the temperature rose to 27° C. Stirring was thereafter continued and the temperature of the reaction mixture maintained at from 60° to 65° C. for two hours to complete the reaction. The reaction mixture was then diluted with 200 milliliters of water, filtered and the filtrate successively washed with aqueous 2 percent sodium hydroxide and water. The reaction medium was then separated from the filtrate by fractional distillation under reduced pressure to obtain an O-(4-phenyl-2-thiazolyl) O-methyl N-isopropyl phosphoramidothioate product as a liquid residue having a refractive index $n/D$ of 1.5388 at 25° C.

In an exactly similar manner, other O-thiazolyl O-alkyl phosphoramidothioates are prepared of which the following are representative:

O-(4-phenyl-2-thiazolyl) O-methyl N-methyl phosphoramidothioate ($n/D$ of 1.589 at 25° C.) by reacting together potassium 4-phenyl-2-thiazololate and O-methyl N-methyl phosphoramidochloridothioate.

O-(4-amyl-2-thiazolyl) O-methyl N-methyl phosphoramidothioate (molecular weight 326.2) by reacting together sodium 4-amyl-2-thiazololate and O-methyl N-methyl phosphoramidochloridothioate.

O-(4-phenyl-2-thiazolyl) O-methyl N-propyl phosphoramidothioate ($n/D$ of 1.5511 at 25° C.) by reacting together sodium 4-phenyl-2-thiazololate and O-methyl N-propyl phosphoramidochloridothioate.

O-[4-(2,4,5-trichlorophenyl)-2-thiazolyl] O-methyl N,N-dibutyl phosphoramidothioate (molecular weight 501.8) by reacting together sodium 4-(2,4,5-trichlorophenyl)-2-thiazololate and O-methyl N,N-dibutyl phosphoramidochloridothioate.

O-[4-(p-iodophenyl)-2-thiazolyl] O-methyl N,N-diethyl phosphoramidothioate (molecular weight 468.1) by reacting together sodium 4-(p-iodophenyl)-2-thiazololate and O-methyl N,N-diethyl phosphoramidochloridothioate.

O-(4-phenyl-2-thiazolyl) O-methyl N-isobutyl phosphoramidothioate ($n/D$ of 1.5438 at 25° C.) by reacting together sodium 4-phenyl-2-thiazololate and O-methyl N-isobutyl phosphoramidochloridothioate.

O-(4-phenyl-2-thiazolyl) O-methyl N,N-dimethyl phosphoramidothioate ($n/D$ of 1.5458 at 25° C.) by reacting together sodium 4-phenyl-2-thiazololate and O-methyl N,N-dimethyl phosphoramidochloridothioate.

O-[4-(p-butylphenyl)-2-thiazolyl] O-methyl N-methyl phosphoramidothioate (molecular weight 356.3) by reacting together sodium 4-(p-butylphenyl)-2-thiazololate and O-methyl N-methyl phosphoramidochloridothioate.

O-[4-(o-methylphenyl)-2-thiazolyl] O-methyl N-methyl phosphoramidothioate (molecular weight of 314.2) by reacting together sodium 4-(o-methylphenyl)-2-thiazololate and O-methyl N-methyl phosphoramidochloridothioate.

O-(4-phenyl-2-thiazolyl) O-ethyl N-ethyl phosphoramidothioate ($n/D$ of 1.5454 at 25° C.) by reacting together sodium 4-phenyl-2-thiazololate and O-ethyl N-ethyl phosphoramidochloridothioate.

O-(4-phenyl-2-thiazolyl) O-propyl N-methyl phosphoramidothioate ($n/D$ of 1.5921 at 25° C.) by reacting together sodium 4-phenyl-2-thiazololate and O-propyl N-methyl phosphoramidochloridothioate.

O-(4-phenyl-2-thiazolyl) O-isopropyl N-isopropyl phosphoramidothioate ($n/D$ of 1.5090 at 25° C.) by reacting together sodium 4-phenyl-2-thiazololate and O-isopropyl N-isopropyl phosphoramidochloridothioate.

O-(4-phenyl-2-thiazolyl) O-propyl N-propyl phosphoramidothioate ($n/D$ of 1.5268 at 25° C.) by reacting together sodium 4-phenyl-2-thiazololate and O-propyl N-propyl phosphoramidochloridothioate.

O-(4-phenyl-2-thiazolyl) O-secondary-butyl N-methyl phosphoramidothioate ($n/D$ of 1.5253 at 25° C.) by reacting together sodium 4-phenyl-2-thiazololate and O-secondary butyl N-methyl phosphoramidochloridothioate.

O-(4-phenyl-2-thiazolyl) O-isobutyl N-methyl phosphoramidothioate ($n/D$ of 1.5331 at 25° C.) by reacting together sodium 4-phenyl-2-thiazololate and O-isobutyl N-methyl phosphoramidochloridothioate.

O-[4-(p-butoxyphenyl)-2-thiazolyl] O-ethyl N,N-dibutyl phosphoramidothioate by reacting together potassium 4-(p-butoxyphenyl)-2-thiazololate and O-ethyl N,N-dibutyl phosphoramidochloridothioate.

O-[4-(2,4-dibromophenyl)-2-thiazolyl] O-methyl N,N-diethyl phosphoramidothioate by reacting together sodium 4-(2,4-dibromophenyl)-2-thiazololate and O-methyl N,N-diethyl phosphoramidochloridothioate.

The new compounds of the present invention have been found to be useful as herbicides and parasiticides for the control of a number of plants, mites, insects and bacterial fungal organisms. For such use, the products may be dispersed on a finely divided solid and employed as dusts. Also, such mixtures may be dispersed in water with the aid of a wetting agent and the resulting aqueous suspensions employed as sprays. In other procedures, the products may be employed as constituents of oil-in-water emulsion or water dispersions with or without the addition of wetting, dispersing or emulsifying agents. In representative operations, aqueous compositions containing 50 parts by weight of O-(4-phenyl-2-thiazolyl) O-methyl N-methyl phosphoramidothioate per million parts by weight of the composition give 100 percent kills of two spotted spider mites.

The 4-substituted thiazolols and their alkali metal salts as employed in accordance with the present invention are prepared in known procedures by reacting ammonium thiocyanate with a suitable haloketone compound having the formula

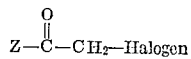

to produce a thiocyanate having the formula

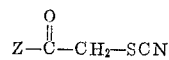

wherein in the formulae Z represents lower alkyl, phenyl, lower alkoxyphenyl, lower alkylphenyl or halophenyl such as chlorophenyl, bromophenyl and iodophenyl. The reaction is carried out in a solvent such as a lower alkanol and takes place at temperatures between 30° and 90° C. with the production of the desired thiocyanate compound and ammonium chloride by-product. Following the reaction, the reaction mixture is filtered and the reaction medium removed by fractional distillation under reduced pressure to separate the desired thiocyanate material. The thiocyanate is then cyclized by boiling with a strong mineral acid such as hydrochloric acid or sulphuric acid to produce the desired 4-substituted thiazolol product. Following the cyclization, the cyclized product is separated from the reaction mixture by extraction with an organic solvent such as diethyl ether, chloroform, chlorobenzene. Removal of the solvent from the extract by evaporation or fractional distillation gives the desired 4-substituted thiazolol product which may be converted to the alkali metal salt by treatment with an alkali metal hydroxide.

The O-lower alkyl phosphoramidochloridothioates employed as starting materials as herein described may be prepared by the reaction at a temperature of from −10° to 50° C. of one molecular proportion of an O-lower alkyl phosphorodichloridothioate with two molecular proportions of ammonia or a lower alkyl amine such as methyl amine, pentyl amine, dimethyl amine, dipropyl amine and dipentyl amine. In carrying out the reaction a benzene solution of the ammonia or the amine is added portionwise to the O-lower alkyl phosphorodichloridothioate reagent dissolved in benzene. Upon completion of the reaction, the hydrochloride byproduct is separated by filtration and the benzene removed by evaporation to obtain the desired intermediate as a residue.

What is claimed is:
1. A compound of the formula

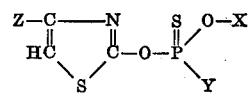

wherein X is lower alkyl, Y is a member of the group consisting of amino and lower alkyl amino and Z is a member of the group consisting of lower alkyl, phenyl, lower alkoxyphenyl, lower alkylphenyl and halophenyl.
2. O-(4-methyl-2-thiazolyl) O-ethyl N-ethyl phosphoramidothioate.
3. O-(4-phenyl-2-thiazolyl) O-methyl N-isopropyl phosphoramidothioate.
4. O-(4-phenyl-2-thiazolyl) O-methyl N-propyl phosphoramidothioate.
5. O-(4-phenyl-2-thiazolyl) O-ethyl N-ethyl phosphoramidothioate.
6. O-(4-phenyl-2-thiazolyl) O-propyl N-methyl phosphoramidothioate.
7. O-(4-phenyl-2-thiazolyl) O-isobutyl N-methyl phosphoramidothioate.
8. O-(4-phenyl-2-thiazolyl) O-methyl N-methyl phosphoramidothioate.

References Cited in the file of this patent
UNITED STATES PATENTS

| | | |
|---|---|---|
| 2,299,535 | Dickey et al. | Oct. 20, 1942 |
| 2,831,014 | Sallman et al. | Apr. 15, 1958 |
| 2,855,422 | Kauer et al. | Oct. 7, 1958 |
| 2,887,505 | Blair | May 19, 1959 |

FOREIGN PATENTS

| | | |
|---|---|---|
| 713,278 | Great Britain | Aug. 11, 1958 |

OTHER REFERENCES

Frear et al.: J. of Economic Entomology, volume 40, pages 736–741 (1947).